Feb. 21, 1967  K. WEBER  3,305,276
SILO CONSTRUCTION
Filed April 8, 1965  2 Sheets-Sheet 1
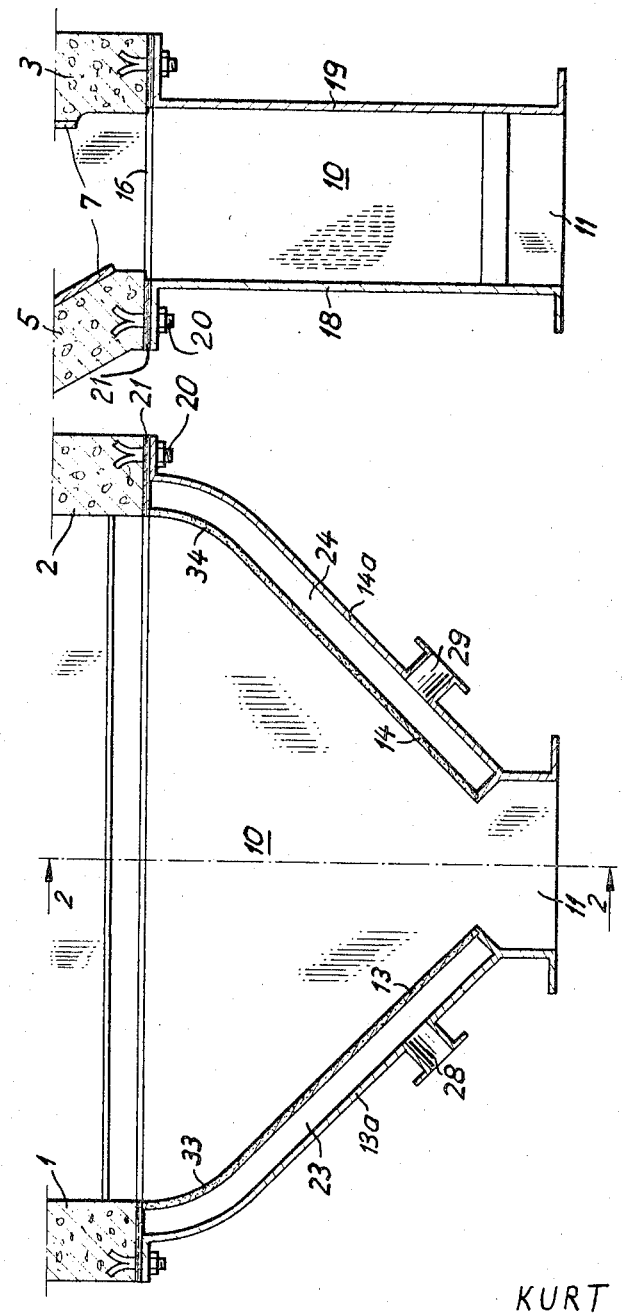
INVENTOR
KURT WEBER

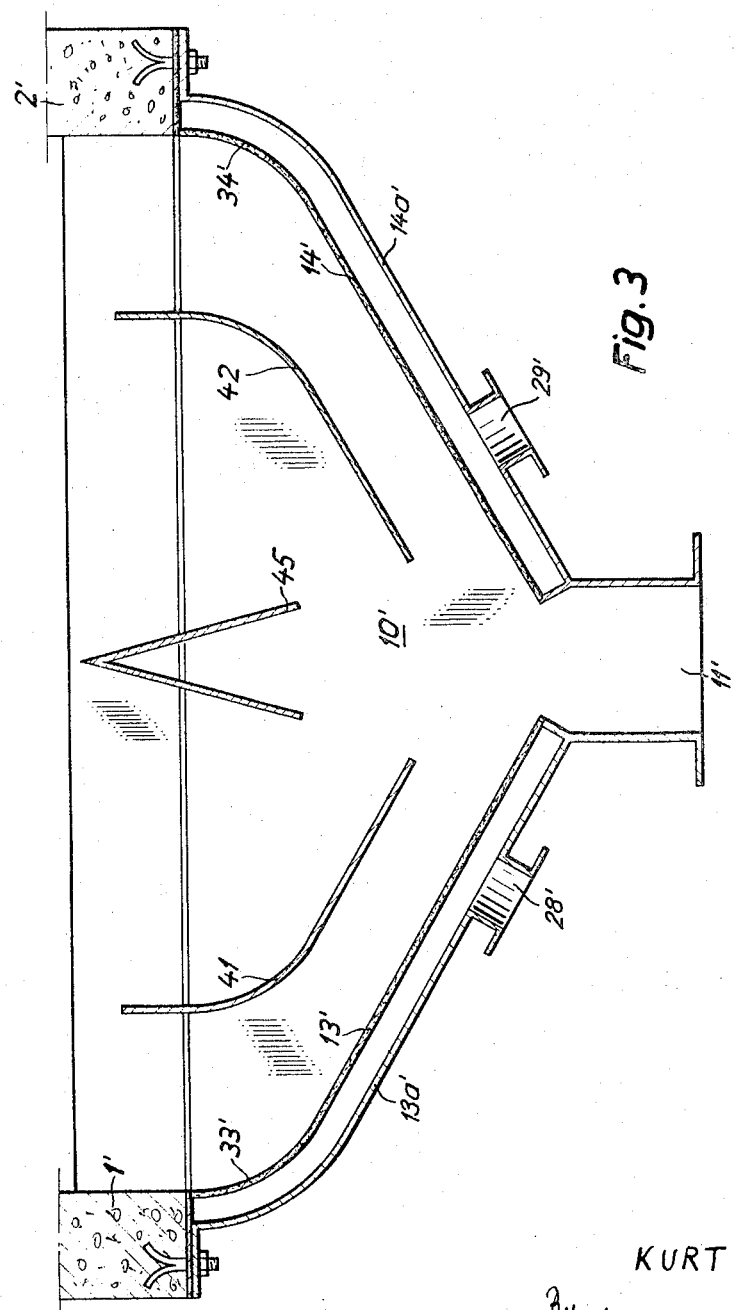

United States Patent Office 3,305,276
Patented Feb. 21, 1967

3,305,276
SILO CONSTRUCTION
Kurt Weber, Niederuzwil, Sankt Gallen, Switzerland, assignor to Gebrueder Buehler, Uzwil, Switzerland
Filed Apr. 8, 1965, Ser. No. 446,605
9 Claims. (Cl. 302—52)

This invention relates in general to the construction of silos and particularly to a new and useful silo having a discharge trough with a double wall with the interior one being air permeable and being located and oriented for improved outflow conditions.

The present invention has particular application for the construction of a silo for fluidizable bulk goods such as flour, feed, grain, etc. It has been known to provide a discharge trough for such a silo which includes means for venting or providing for air discharge in the vicinity of the discharge trough in order to discharge the stored material in a fluid state. Airable troughs of this nature are sometimes covered with roof-shaped inserts in a manner such that the material enters laterally from the silo onto the trough. The flow section is thus greatly relieved relative to the material stored in the silo proper. It is also known to divide the silo bottoms and/or the inserts laterally of the flow into panels for ventilation. Such known arrangements generally permit a controlled discharge of the silo material free of bridges and trenches. However, they have the disadvantage that they require great expenditure for the apparatus and construction and they are frequently poorly ventilated in the transition zone from the silo wall to the trough bottom. This results in poor flow properties of the stored materials in the transition zone.

The present invention eliminates the disadvantages of the known devices and provides new advantages. The invention includes a silo for fluidizable bulk goods having a narrow discharge trough compared to the area of the silo which is located thereabove. The trough includes an air permeable bottom with an outlet in the center of the trough. The trough is characterized by a combination of the following features. The trough is so inclined that the material is only fluid in the ventilated state. The trough is uniformly inclined from the region of the outlet opening to the region of the connection to the silo. The trough includes a curved transition portion extending from the silo to a region of uniformly inclined walls extending to the central discharge opening. At least the curved transition portion is made of air permeable material. This arrangement has the advantage of a substantially more intensive ventilation in the transition zone from the wall of the silo to the bottom of the trough.

In a further embodiment of the invention, the trough advantageously includes special inserts and spaced bottom walls which provide means for increasing the fluidity of the substance when it is discharged through the opening.

Accordingly, it is an object of the invention to provide an improved silo or silo trough discharge construction which advantageously includes a central opening and with uniformly sloping walls extending upwardly from the opening toward the silo and characterized by a curved transition zone which is gas permeable in order to increase the fluidity of the flow properties of the material stored in the silo for facilitating the discharge thereof.

A further object of the invention is to provide a trough discharge construction for a silo and the like which includes gradually inclined wall portions in the region of an outlet which are inclined so that the material is only fluid when in a ventilated state and with a transition zone being provided which extends from the inclined walls to the silo, and further characterized by either the transition walls or the inclined walls or both being air permeable to facilitate the discharge of the material.

A further object of the invention is to provide a silo and a trough therefor which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a partial transverse sectional view of the lower portion of a silo with a discharge trough constructed in accordance with the invention;

FIG. 2 is a section taken on the line 2—2 of FIG. 1; and

FIG. 3 is a view similar to FIG. 1 of another embodiment of the invention.

Referring to the drawings in particular, the invention embodied therein in FIGS. 1 and 2 includes a trough generally designated 10 which is arranged at the bottom or discharge end of a silo having side walls 1 and 2, rear wall 3, and an inclined bottom 5. The discharge trough 10, in accordance with the invention, has a central outlet 11 and is provided with a bottom comprising inner porous bottom walls or bottoms 13 and 14 which are formed inwardly from outer walls 13a and 14a and define therebetween air chambers 23 and 24, respectively. The air chambers or gas chambers are connected through openings 28 and 29, respectively.

In accordance with the invention, the trough 10 is of a type which permits it to be easily connected to a silo such as trough bolts 20 which are applied through packing elements 21. The silo includes, as a feature of the construction, rounded transition pieces 33 and 34 which are formed as gradually curved continuations of the straight vertical side walls 1 and 2. The rounded transition pieces 33 and 34, as well as the whole inclined walls 13 and 14, are advantageously made of a porous material or a gas permeable material. The permeability of the transition zones 33 and 34 may be the same as the permeability of the walls 13 and 14 at a location adjacent the discharge opening 11.

The inclined bottom 5, and also the silo walls 3, are preferably provided in the vicinity of the discharge trough 10 with a coating 7. In addition, it is desirable to provide a small relief nosing 16 on the silo wall 3 directly above the discharge trough 10.

The trough construction indicated has a great advantage in that the fluidizing medium which is gas which is injected into the silo cell and into the discharge trough, respectively, will accumulate during ventilation, particularly at the location of the transition pieces 33 and 34. But since the transitions 33 and 34 cause an increase of the friction of the solid material in regard to the silo walls 1 and 2 on the one hand, and with regard to the discharge trough on the other, and since the constant fluidity and full discharge in the region of these transitions have always offered difficulties when they meet in an obtuse angle, the change to the gradual rounded transition will enhance the fluidization of the material considerably. The material is under great load on the inclined bottoms 13 and 14 due to the weight of the material in the silo. The inner coefficient in the marginal zone of the bulk material when entering the transition zones 33 and 34 drops immediately to a minimum, and the pressure of the bulk material is thus deflected to a great extent to the outlet opening. This is done continually, starting from the vertical walls 1 and 2 and not suddenly as known in the case where the construction was that the walls 1 and 2 meet at an obtuse angle with the inclined walls 13 and 14 as in prior art constructions. Since the silo material above the discharge trough can be considered furthermore at a certain level as being compact, there is no danger that the fluidization gas will issue along the silo walls 1 and 2, and thus not lead to a fluidization of the material. Due to the increased fluidization of the material in the region of the rounded transition pieces 33 and 34, however, the silo material drops uniformly toward the outlet 11. Due to this special design of the discharge trough underneath the storage cell in the silo proper, particularly in the region of the silo walls, there is an additional known advantage of sanitary discharge without mechanical means and the additional advantage that the formation of central shafts and bridges is made impossible and the material drops uniformly over the entire silo cell surface.

In the embodiment indicated in FIG. 3, there is provided a trough 10 which advantageously may be made of a funnel-shaped configuration including a central discharge 11' which may be cylindrical. It has been found that it is advantageous to provide inserts 41 and 42 which are arranged parallel to the silo walls 1' and 2' at their upper ends and parallel to the inclined portions 13' and 14' at their lower ends, with a curved transition portion being provided intermediate the length thereof. In this embodiment the walls 13' and 14' are of porous material and include the curved transition portions 33' and 34' as in the other embodiment. The curved inserts 41 and 42 provide a relief for the porous bottom walls 13' and 14' and thus provide a more favorable fluidization of the silo material thereabove. It has also been found advantageous to include a central diverting element or gusset 45 which is provided in alignment with the central outlet in such a way that the outlet 11 is at least partly relieved of the material stored thereabove. Of course, it is possible to provide a construction which includes only the central gusset 45 or the central gusset 45 with the inserts 41 and 42 in accordance with the particular type of material being employed. The inserts 41 and 42 and the gusset 45 provide very inexpensive and simple fittings which have a favorable effect on the dropping and the flow of the material through the outlet 11'.

In addition, they provide means for aiding in the fluidization or easy flow of the material in the region of the discharge opening 11' depending on the form and the size of the cells. It is logical and within the range of the inventive idea that the silo cell has a circular base above the discharge trough 10' and that the outlet 11 is centrally arranged in respect thereto. In the embodiment illustrated in FIG. 3, the porous bottoms 13' and 14' are designed as circular ring-shaped funnels and with rounded transition zones 33' and 34' passing over into the silo walls 1' and 2'.

While specific embodiments of the invention have been shown and described in detail to illustrate the application of the inventive principles, it will be understood that the invention may be embodied otherwise without departing from such principles.

What is claimed is:

1. A silo construction including two side walls, a rear wall and an inclined silo bottom, defining a silo for the storage of material having a discharge adjacet the lower end thereof, a trough connected to said wall means at the discharge end and having a central opening defining a material discharge and further including a trough bottom with a curved transition wall portion forming a surface which is flush with said side walls and extending inwardly and downwardly toward said material discharge, said trough bottom also including an inclined wall portion sloping downwardly from said transition wall portion to the discharge and being of an inclination such that bulk material in said silo supported on said inclined wall portion is fluid only in the aerated state, said bottom being of porous material to permit passage of gases therethrough.

2. A silo construction including wall means defining a silo for the storage of material having a discharge adjacent the lower end thereof, a funnel-shaped trough connected to said wall means at the discharge end and having a central cylindrical portion with a lower opening defining a material discharge and further including a trough bottom with an annular curved transition wall portion forming a surface which is flush with said wall means and extending inwardly and downwardly toward said material discharge, said bottom also including an annular inclined wall portion sloping downwardly from said transition wall portion to said cylindrical portion and being of an inclination such that bulk material in said silo supported on said inclined wall portion is fluid only in the aerated state, at least said transition wall portion of said bottom being of porous material to permit passage of gases therethrough.

3. A silo construction including wall means defining a silo for the storage of material having a discharge adjacent the lower end thereof, a trough connected to said wall means at the discharge end and having an opening defining a material discharge and further including a bottom with a curved smooth transition wall portion forming a surface extending inwardly and downwardly from said wall means toward said material discharge, said bottom also including an inclined wall portion sloping downwardly from said transition wall portion to the discharge and being of an inclination such that bulk material in said silo supported on said inclined wall portion is fluid only in the aerated state, at least said transition wall portion of said bottom being of porous material to permit passage of gases therethrough, said silo wall means defining substantially vertical side walls, an inclined silo bottom, and a substantially vertical rear wall, said trough having said bottoms arranged with the transition zone flush with said side walls.

4. A silo construction including side front and rear wall means defining a silo for the storage of material having a discharge adjacent the lower end thereof, a trough connected to said wall means at the discharge end and having an opening defining a material discharge and further including a bottom with a curved smooth transition wall portion forming a surface extending inwardly and downwardly from said side wall means toward said material discharge, said bottom also including an inclined wall portion sloping downwardly from said transition wall portion to the discharge and being of an inclination such that bulk material in said slio supported on said inclined wall portion is fluid only in the aerated state, at least said transition wall portion of said bottom being of porous material to permit passage of gases therethrough, said rear wall having an inwardly beveled portion directly above a wall of said trough.

5. A silo for fluidizable bulk goods including walls defining a silo cell and discharge trough connected to the lower end of said cell having an airable bottom and an outlet in the center of the trough, and characterized by the combination of the following features: that said trough is inclined so that the bulk material is only fluid in the aired state; that said trough is uniformly inclined from the region of the central outlet opening into the region of the limitations farthest away therefrom; that said trough passes from the region of the uniform inclination through a curved transition piece into the region of the vertical walls; and that said curved transition piece is airable.

6. A silo according to claim 5, characterized in that the curved transition piece is designed as a separate radially arced piece.

7. A silo according to claim 5, characterized in that inserts are provided parallel to said bottom.

8. A silo according to claim 5, characterized in that a gusset is arranged transverse to the trough above the inserts and above the central outlet.

9. A silo according to claim 5, characterized in that the silo includes a wall with a projecting nose directly above the trough.

References Cited by the Examiner
UNITED STATES PATENTS

| | | | |
|---|---|---|---|
| 1,964,345 | 6/1934 | Feller | 222—195 X |
| 2,667,280 | 1/1954 | Lane et al. | 302—36 X |

FOREIGN PATENTS

| | | |
|---|---|---|
| 196,794 | 8/1957 | Austria. |
| 1,156,415 | 5/1958 | France. |
| 187,320 | 1/1964 | Sweden. |

ANDRES H. NIELSEN, *Primary Examiner.*

EVON C. BLUNK, *Examiner.*

A. L. LEVINE, *Assistant Examiner.*